United States Patent Office 3,118,215
Patented Jan. 21, 1964

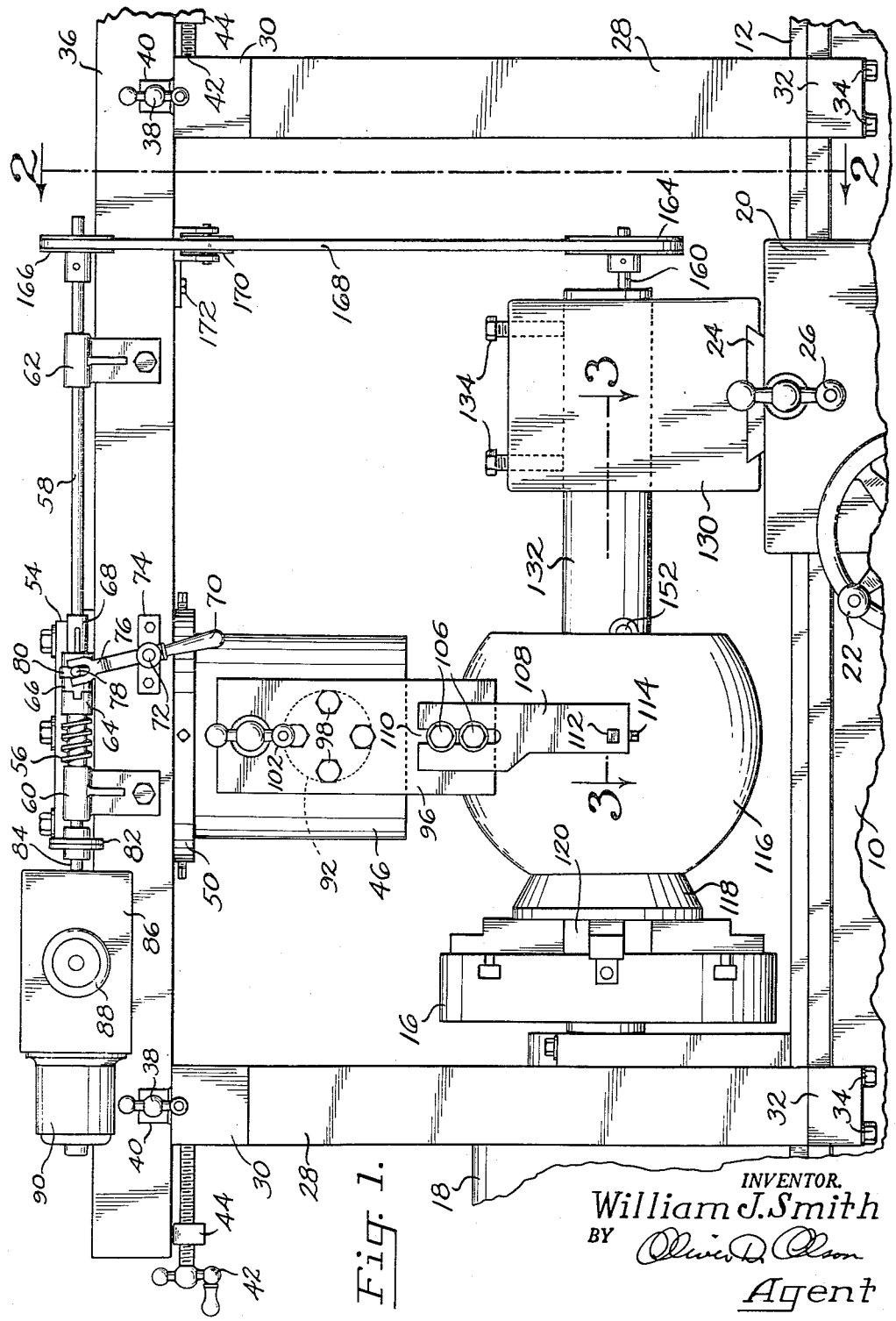

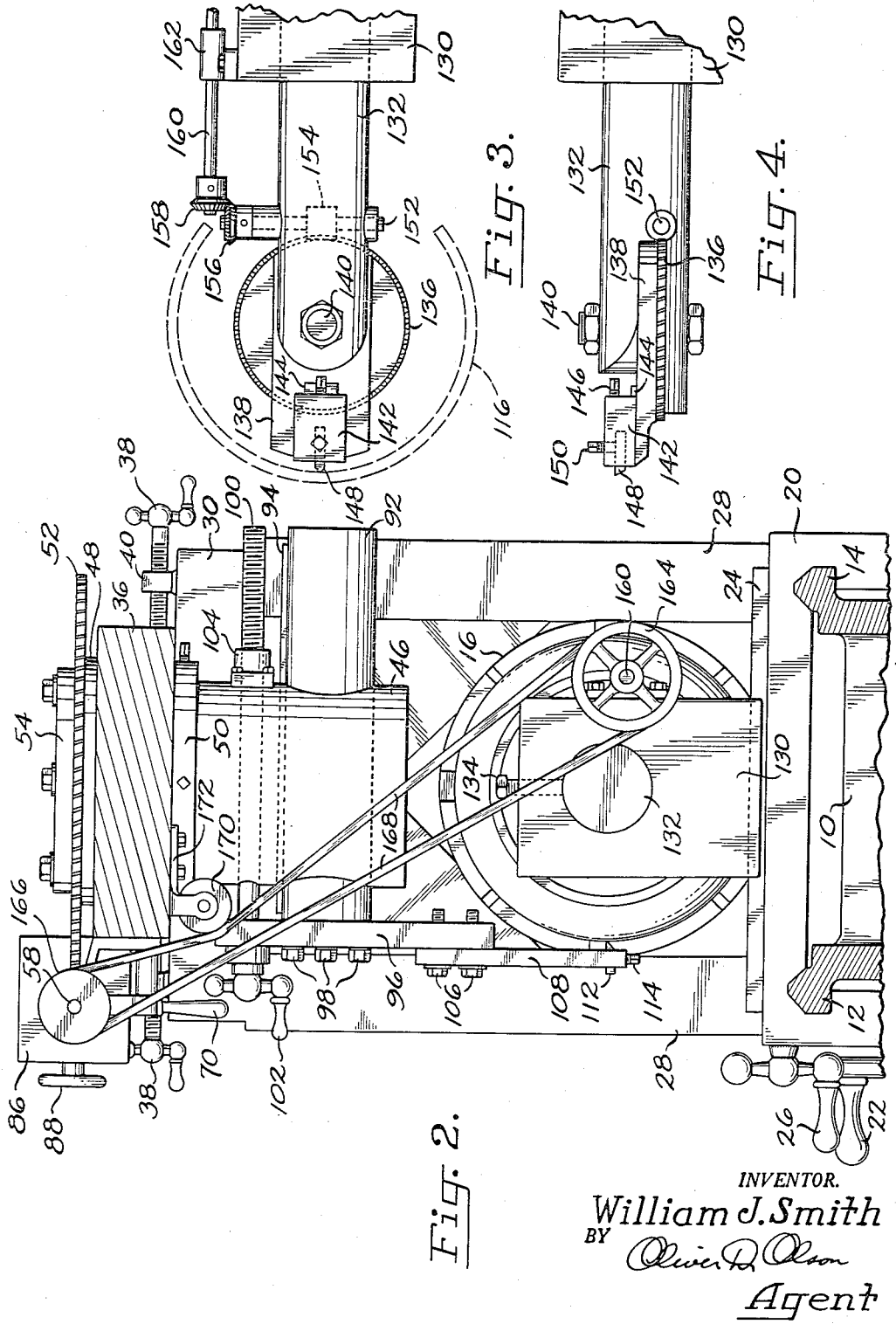

3,118,215
APPARATUS FOR MAKING CURVED SURFACES
William J. Smith, 1611 12th St., Oregon City, Oreg.
Continuation of application Ser. No. 726,436, Apr. 4, 1958. This application Sept. 20, 1961, Ser. No. 140,970
2 Claims. (Cl. 29—27)

This invention pertains to lathes and like cutting and grinding apparatus, and relates particularly to apparatus by which to form spherical or other curved surfaces. This application is a continuation of my earlier filed application, Serial No. 726,436 filed April 4, 1958 and now abandoned.

In the operation of a lathe, for example, a piece of work is mounted for rotation on an axis and a cutting tool is moved along a straight line parallel to the axis of rotation, whereby to form a cylindrical surface on the work. However, it is often desired to provide a piece of work with a spherical or other curved surface, and it is the principal object of the present invention to provide apparatus by which to form such surfaces.

Another important object of this invention is the provision of apparatus which may be utilized in cooperation with a conventional lathe, for purposes of forming a curved surface on a piece of work.

A further important object of the present invention is the provision of apparatus by which to form a spherical or other curved surface upon either or both outer and inner surfaces of a hollow object.

A still further important object of the present invention is to provide apparatus for forming curved surfaces on an object, which apparatus is of simplified construction for economical manufacture and which is precise in its operation.

The foregoing and other objects and advantages of this invention will appear from the following detailed description, taken in connection with the accompanying drawings, in which:

FIG. 1 is a fragmentary view in side elevation of a conventional lathe having mounted in cooperative relation therewith, apparatus embodying the features of the present invention;

FIG. 2 is a fragmentary sectional view taken along the line 2—2 in FIG. 1;

FIG. 3 is a fragmentary sectional view taken along the line 3—3 in FIG. 1 and showing details of construction of mechanism by which to form a spherical inner surface on a hollow object; and FIG. 4 is a fragmentary view in side elevation of the assembly shown in FIG. 3, as viewed from the bottom of FIG. 3.

Although the apparatus of the present invention may be provided in the form of a complete and integral unit, it is conveniently provided in the form of an attachment to a conventional lathe, and it is this embodiment that is illustrated in the drawings. The lathe includes a base frame 10 which supports laterally spaced longitudinal ways 12 and 14, a rotary chuck 16 driven by a motor 18 for rotation on an axis substantially parallel to the longitudinal ways, and a tool carriage 20 mounted on the ways for movement in the longitudinal direction of the latter, as by means of a rack and pinion assembly operable by a hand wheel 22. A tool crossfeed normally is movable thereon as by means of a rack and pinion assembly operable by a micrometer handle 26.

The apparatus of the present invention includes a pair of longitudinally spaced structural frames, each comprising the laterally spaced vertical supports 28 and the horizontal top member 30. Although the vertical supports may extend to the base which supports the lathe, and thus be independent of the lathe, they are proportioned in the embodiment illustrated for support upon the ways. Clamp elements 32 are removably secured to the bottom ends of these supports, as by means of the bolts 34, and they underlie the ways for securing the supports firmly to the lathe.

Mounted upon the transverse top members of the frame and extending horizontally therebetween is a structural member 36, preferably of substantial dimension providing considerable weight and rigidity. This member is adjustable transversely and longitudinally with respect to the supporting frames. Thus, transversely extending adjusting micrometer screws 38 are secured in threaded lugs 40 projecting from the top members 30 of the frames, with the inner ends of the screws abutting the structural member for securing the latter in transversely adjusted position. Similarly, elongated adjusting screws 42 secured in the threaded lugs 44 projecting from the underside of the structural member 36 adjacent the opposite ends of the latter, function to abut the vertical frames and thus secure the structural member in longitudinally adjusted positions.

Extending freely through a vertical opening in the structural member 36 is a rotary post 46, the upper end of which is enlarged to provide a flange 48 which rests upon the upper surface of the structural member and thus supports the post in a vertically suspended position. An annular collar 50 is releasably secured about the post adjacent the under surface of the structural member 36, as by means of the screws illustrated, to prevent vertical displacement of the post.

A gear wheel 52 of substantial diameter is mounted upon this enlarged end of the post and secured thereto by means of the plate 54 and the securing bolts illustrated. Engaging the gear is a worm 56 which is mounted freely upon a shaft 58 journaled for rotation in the bearings 60, 62 supported by the structural member 36. One section 64 of a clutch is secured to the worm, while the cooperating section 66 of the clutch is keyed slidably to the spline 68 secured to the shaft 58. Axial movement of the clutch section 66 is effected by means of the hand lever 70 which is mounted pivotally intermediate its ends on the pivot pin 72 projecting from a bracket 74 secured to the structural member 36. The lever is provided with a bifurcated yoke end 76 the spaced sections of which are slotted to secure the radial pins 78 projecting from a bearing 80 mounted rotatably in a peripheral groove provided in the clutch section 66.

One end of the shaft is connected through the coupling 82 to the output shaft 84 of a gear reduction unit 86, the speed and direction of which is adjustable by means of the hand wheel 88. The input shaft of the gear reduction unit is connected to a drive motor such as the electric motor 90 illustrated.

A transverse bore is provided in the rotary post adjacent the lower end of the later for receiving the shaft 92 slidably therethrough. The shaft is secured against axial rotation within the bore by such means as the key 94 which is secured to the shaft and is slidably received within a keyway formed in the post. A vertical plate 96 is secured intermediate its ends to the front end of the shaft, as by means of the bolts 98. Mounted in the plate adjacent its upper end is an elongated micrometer screw 100, provided at its outer end with an operating handle 102. The screw is mounted in the plate for axial rotation but is constrained therein against longitudinal displacement. The screw extends through a transverse bore in the rotary post and is threaded through a projection 104 secured to the post. Thus, as the handle is manipulated to rotate the screw, the plate is caused to move in a vertical plane toward or away from the post.

The lower end of the plate is provided with one or more threaded openings adapted to receive the securing bolts 106. A tool holder 108 is provided with a slot 110 at one end adapted to receive the securing bolts, whereby to secure the tool holder firmly to the plate. The opposite end of the tool holder is provided with a transverse opening adapted to receive a cutting tool 112 therein, and a set screw 114 is provided in the tool holder to releasably secure the cutting tool in adjusted position.

The operation of the apparatus thus far described, is as follows: The structural member 36 is adjusted laterally and longitudinally by means of the adjusting screws 38, 42 so as to position the rotational axis of the post 46 precisely on and normal to the rotational axis of the lathe chuck 16, at the desired center of the spherical surface to be formed. The tool holder 108 is also adjusted vertically to position the cutting edge of the tool 112 on the proper cutting plane, as is well known in the art. With the object to be surfaced mounted firmly in the lathe chuck, the tool is drawn into proper cutting relation with the object by manipulation of the operating handle 102 of the screw 100. In the drawings the object to be surfaced is shown to be a hollow metal casting in the form of a segmented sphere 116, provided with a base 118 and projecting plug 120 which is adapted to be secured firmly between the jaws of the lathe chuck.

With the lathe chuck being rotated by its motor and the cutting tool 112 positioned at one end of the outer spherical segment to be surfaced, the electric motor 90 is energized and the clutch sections 64, 66 engaged by manipulation of handle 70, thereby rotating the gear 52 and attached post 46 in the direction to move the cutting tool 112 arcuately toward the opposite end of the spherical segment 116, thereby forming a smooth and precisely spherical surface on the outer side of the object.

If it is desired to make another cut to reduce the diameter of the object, the direction of rotation of the post is reversed, either by use of a reversible electric motor or by the reversible gear reduction unit illustrated, and the second cut made either during such reverse rotation of the post, or, alternatively, the second cut may be made in the same direction as the first cut, after the tool has been returned to its initial position.

Means also is provided for forming a curved surface on the inner side of an object, either independently of or simultaneously with the formation of the outer surface. To this end there is provided a tool crossfeed 130 adapted to replace the conventional lathe tool crossfeed on the key 24. This tool crossfeed preferably is provided with the rack and pinion assembly of the conventional lathe tool crossfeed, for cooperation with the operating handle 26. Thus, the tool crossfeed is rendered adjustable along the key, transversely of the lathe ways, by the same means normally provided on a conventional lathe.

A longitudinal bore is provided in the tool crossfeed, the axis of the bore extending parallel to the lathe ways. The bore is adapted to slidably receive a shaft 132 therethrough, the latter being releasably secured therein by such means as the set screws 134 carried by the tool crossfeed.

The forward end of the shaft is slotted transversely to receive freely therein the gear 136 and attached tool post 138. The gear and post are mounted for rotation within the slot by means of the pivot bolt 140 which extends through aligned openings in the bifurcated ends of the shaft, the gear and tool post. A tool holder 142 is mounted adjustably on the tool post as by means of the key 144 carried by the tool post and a cooperating keyway formed in the tool holder, and is adjustable by means of the micrometer screw 146. The tool holder is slotted to receive a cutting tool 148 therein, secured in positions of adjustment by means of the set screw 150.

A shaft 152 extends freely through a transverse opening in the shaft 132, and carries a worm 154 which is positioned for engagement with the gear 136. A bevel gear 156 is secured to one extending end of the shaft 152 for engagement with a second bevel gear 158 secured to the end of a drive shaft 160 which is mounted in bearings 162 supported by the tool crossfeed 130. Engagement of the bevel gears is achieved by adjusting the shaft 132 longitudinally through the bore of the tool crossfeed until the bevel gears mesh. This arrangement accommodates convenient disassembly of the parts.

The drive shaft 160 is driven conveniently by connection to the shaft 58, by means of the pulleys 164, 166 and belt 168. An idler pulley 170 is mounted on a bracket 172 secured adjustably to the under side of the structural member 36, and functions to engage and hold the belt 168 away from the member 36. It will be understood that the idler pulley 170 may be adjusted along the structural member and the pullleys 164 and 166 may be adjusted along the shafts, to accommodate varying the position of the tool carriage 20 along the length of the lathe ways. Although the pulley 166 is shown to be releasably connected to the shaft 58 by such means as a set screw, it will be understood that releasable coupling to the shaft may be provided by such means as the clutch assembly associated with the worm 56, previously described.

The operation of the internal cutting apparatus last described is as follows: The lathe tool carriage 20 is adjusted along the lathe ways and the tool crossfeed 130 is adjusted transversely thereof so as to position the axis of the pivot bolt 140 precisely on the vertical axis of the spherical object 116 to be surfaced. It will be apparent that this axis will be the same as the axis of rotation of the post 46. With the cutting tool 148 positioned initially adjacent the open end of the hollow object and the latter rotated by chuck 16, the drive motor 90 is energized to cause rotation of the shaft 160 through the belt and pulley assembly. Rotation of this shaft causes simultaneous rotation of the worm 154 and engaging gear 136, thereby moving the cutting tool 148 arcuate about the axis of pivot bolts 140. In this manner the inner surface of the object is formed with a smooth and precisely spherical surface.

It will be appreciated that the inner and outer surfaces of the object may be acted upon by the cutting tools 148 and 112, respectively, either independently of each other or simultaneously. If simultaneous cuttings are desired, it may also be desired that the cutting tools traverse their respective arcuate paths in substantially the same time. In such event the dimensions of pulleys, gears and worm assemblies may be chosen to achieve this result, as will be apparent.

The apparatus is shown in the drawings arranged to form a spherical surface on the object 116. It will be apparent that other curved surfaces may be formed by various manipulations of the adjustable components of the apparatus. For example, the spherical surface is provided by arranging the rotational axis of the post 46 or pivot bolt 140 normal to and intersecting the rotational axis of the chuck 16. By displacing the rotational axis of the post or pivot bolt either side of the rotational axis of the chuck by adjustment of the screws 38, 42 and crank 26, various non-spherical curved surfaces may be formed. Further variations may be made.

Although the apparatus illustrated employs cutting tools 112 and 148 of the lathe turning type, other forms of tool may be used, such as grinding and polishing elements.

It will be apparent to those skilled in the art that various changes in the details of construction described hereinbefore may be made without departing from the spirit of this invention and the scope of the appended claims.

Having now described my invention and the manner in which the same may be used, what I claim as new and desire to secure by Letters Patent is:

1. Apparatus for making a curved surface on a work piece, comprising a base frame, a work support mounted on the base frame for rotation on a horizontal axis, spaced upright frame members mounted on the base frame and projecting upwardly beyond said horizontal axis, a rigid structural member supported freely on the upper ends of said frame members, a post member supported on said structural member for rotation on a vertical axis, a tool support mounted on the post member for supporting a tool radially outward from said vertical axis and radially outward from the horizontal axis of the work support, drive means mounted on the structural member and engaging the post member for rotating the latter, and adjustable connector means interengaging the structural member and the spaced upright frame members for adjusting the structural member longitudinally and laterally relative to the upright frame members for adjusting said vertical axis of the post member longitudinally and radially relative to the horizontal axis of the work support.

2. The apparatus of claim 1 including longitudinal ways on said base frame, a tool carriage mounted for longitudinal movement on said ways, a crossfeed member mounted for transverse movement on said tool carriage, a shaft projecting from said crossfeed member, tool holding means supported on the shaft for rotation on an axis substantially normal to the rotational axis of the work support, and adjustable drive connector means interconnecting the tool holding means and the drive means for the post member.

References Cited in the file of this patent
UNITED STATES PATENTS

| | | |
|---|---|---|
| 84,697 | Joyce | Dec. 8, 1868 |
| 1,247,735 | Stead | Nov. 27, 1917 |
| 1,455,444 | Maynard et al. | May 15, 1923 |
| 1,478,686 | Teller | Dec. 25, 1923 |
| 2,380,808 | Tyson | July 31, 1945 |

FOREIGN PATENTS

| | | |
|---|---|---|
| 212,687 | Switzerland | Dec. 15, 1940 |